United States Patent
Thies et al.

(10) Patent No.: US 11,491,430 B2
(45) Date of Patent: Nov. 8, 2022

(54) FILTER UNIT

(71) Applicant: Glatt GmbH, Binzen (DE)

(72) Inventors: Jochen Thies, Loerrach (DE); Adrian Kape, Rheinfelden (DE); Dirk Zimmermann, Wehr (DE)

(73) Assignee: Glatt GmbH, Binzen (DE)

( * ) Notice: Subject to any disclaimer, the term of this patent is extended or adjusted under 35 U.S.C. 154(b) by 13 days.

(21) Appl. No.: 15/734,630

(22) PCT Filed: May 20, 2019

(86) PCT No.: PCT/EP2019/062947
§ 371 (c)(1),
(2) Date: Dec. 3, 2020

(87) PCT Pub. No.: WO2019/233747
PCT Pub. Date: Dec. 12, 2019

(65) Prior Publication Data
US 2021/0229015 A1   Jul. 29, 2021

(30) Foreign Application Priority Data
Jun. 4, 2018 (DE) ..................... 10 2018 208 746.6

(51) Int. Cl.
*B01D 46/00* (2022.01)
*B01D 46/24* (2006.01)

(52) U.S. Cl.
CPC ..... *B01D 46/0002* (2013.01); *B01D 46/2414* (2013.01); *B01D 2271/022* (2013.01); *B01D 2271/027* (2013.01)

(58) Field of Classification Search
CPC ........... B01D 46/0002; B01D 46/2414; B01D 46/02; B01D 2271/022; B01D 2271/025; B01D 2271/027; B01D 2265/06; B01D 46/68; B01D 46/681; B01D 46/682; B01D 46/71; B01D 46/72; B01D 46/24; B01D 46/2411
See application file for complete search history.

(56) References Cited

U.S. PATENT DOCUMENTS 3,849,092 A * 11/1974 Bakke ................... B01D 46/71
  55/502
4,058,379 A * 11/1977 Cheng ................... B01D 46/04
  55/501

(Continued)

FOREIGN PATENT DOCUMENTS

CN 107743414 A 2/2018
DE 8227549 U1 2/1983

(Continued)

*Primary Examiner* — Robert Clemente
(74) *Attorney, Agent, or Firm* — The Webb Law Firm

(57) ABSTRACT

A filter unit configured to be arranged on a process apparatus for particulate removal from process air of a process apparatus includes a filter housing, a filter basket including a filter basket ring, and a filter. The filter is permeable to process air and impermeable to particles being treated. The filter basket is arranged between the filter housing and the filter, and the filter basket and the filter are fastenable to the filter housing. The filter unit includes a sealing mechanism including a sealant element. The sealing mechanism including a sealing element is arranged on the lower region of the filter housing.

18 Claims, 5 Drawing Sheets

(56) References Cited

U.S. PATENT DOCUMENTS

| | | | |
|---|---|---|---|
| 5,178,652 | A | 1/1993 | Hüttlin |
| 5,202,021 | A | 4/1993 | Griffen et al. |
| 6,013,216 | A | 1/2000 | Watanabe et al. |
| 2003/0192432 | A1 | 10/2003 | Gubler |
| 2014/0215982 | A1 | 8/2014 | Wood et al. |
| 2016/0214040 | A1 | 7/2016 | Morris et al. |
| 2016/0348790 | A1 | 12/2016 | Zuerker et al. |
| 2018/0290091 | A1 | 10/2018 | Winter et al. |

FOREIGN PATENT DOCUMENTS

| | | | |
|---|---|---|---|
| DE | 69218697 | T2 | 10/1997 |
| DE | 69726691 | T2 | 6/2004 |
| DE | 60314503 | T2 | 3/2008 |
| DE | 102007046167 | A1 | 4/2009 |
| DE | 112012002708 | T5 | 4/2014 |
| DE | 102015113127 | A1 | 2/2017 |
| EP | 1905507 | B1 | 3/2011 |
| EP | 3101244 | A1 | 12/2016 |
| WO | 8900078 | A1 | 1/1989 |
| WO | 2007054704 | A1 | 5/2007 |

* cited by examiner

FILTER UNIT

CROSS-REFERENCE TO RELATED APPLICATIONS

This application is the United States national phase of International Application No. PCT/EP2019/062947 filed May 20, 2019, and claims priority to German Patent Application No. 10 2018 208 746.6 filed Jun. 4, 2018, the disclosures of which are hereby incorporated by reference in their entirety.

BACKGROUND OF THE INVENTION

Field of the Invention

The invention relates to a filter unit which can be arranged on a process apparatus, in particular on a granulation apparatus or fluidisation apparatus, for the particulate removal from process air of the process apparatus, with a filter housing which comprises a filter basket, wherein the filter basket comprises a hood-like filter which consists of a flexible, textile fabric, said filter being permeable to process air but holding back the particles of the material which are to be treated, and wherein the filter basket is arranged between the filter housing and the filter and the filter basket and the filter are fastenable or are fastened to the filter housing in a direct or indirect manner.

Description of Background Art

Filter units comprising filters have been known for some time in the state of the art. Filter units which are specified in the state of the art are hereinafter briefly summarised:

The publication of the international application in the German translation DE 38 90 559 T5 (corresponding to WO 8900078 A1) discloses a fluidised bed granulator for manufacturing particles or a coated powder by way of spraying a powder with a binding agent fluid or a coating fluid whilst the powder is held in a fluidised bed, and wherein at least one section of the housing of the fluidised bed granulator is formed by a porous membrane which is designed as a filter. The disadvantage of the represented technical solution is the fact that with regard to the process apparatus, no filter housing is formed for the protection of the porous membrane. Furthermore, according to the technical design, the process air flows through the at least one porous membrane which replaces a housing part, into the environment, by which means a further integration of the exiting process air is not possible.

The translation of the European patent document DE 697 26 691 T2 describes a unit for granulating powder, comprising a closable container, a spray nozzle which is attached on the upper side of the container, a first filter for forming a powder layer, as well as a lower air feed chamber, wherein the first filter is arranged such that a space is delimited between the first filter and the inner side of the wall of the container, and that units for cleaning and suctioning are provided, in order to selectively carry out a cleaning-away or suctioning-away through the first filter, wherein the space between the first filter and the inner side of the wall of the container is subdivided into a plurality of zones, and wherein the units for cleaning and suction are capable of carrying out a cleaning through the first filter in one zone and a suctioning through the first filter in another zone. The disadvantage of the shown technical solution is the fact that an exchange or a change of the filter or filters demands an increased time effort.

The European patent document EP 1 905 507 shows a unit for treating particle-like material, with a housing, in which a process chamber is present for receiving the material to be treated, said process chamber comprising a base, through which process air can be introduced into the process chamber, and with a hood-like formation which extends up to an upper end region of the housing and is fixed there via a holder, wherein the hood-like formation consists of a flexible, textile fabric which is permeable to the process air, but holds back the particles of the material which are to be treated, and wherein the process chamber is formed in the interior of the hood-like formation, and wherein the hood-like formation, coming from the peripheral edge of the base, rises over the base, and at least in its upper region is provided with folds. The disadvantage of the technical solution which is disclosed in the European patent specification is the fact that the filter which is designed as a hood-like formation is connected to a peripheral edge of the base in a fixed and sealed manner, so that an exchange or change of the filter demands an increased time effort due to a process apparatus which is to be completely disassembled into its individual parts.

BRIEF SUMMARY OF THE INVENTION

It is therefore the object of the present invention to provide a filter unit which apart from particulate removal from the process air of a process apparatus, in particular of a granulation or fluidisation apparatus, renders possible a time-efficient exchange or change of the built-in filter.

With regard to a filter unit of the initially mentioned type which is arranged on a process apparatus, preferably on a granulation apparatus or fluidisation apparatus, particularly preferably a fluidised bed facility, this object is achieved by way of the filter basket comprising a filter basket ring and in the operating state of the process apparatus the filter in its lower region being connected over its complete periphery to the filter basket ring of the filter basket, and the filter unit comprising a sealing mechanism with a sealing element which is arranged on the filter housing in the lower region of this, wherein the sealing element in the operating state of the process apparatus interacts with the filter housing, the filter basket ring and the process apparatus in a manner such that a sealing can be produced or is produced between the filter housing, the filter basket ring and the process apparatus, so that the filter housing is subdivided by way of the sealing mechanism and the filter into a process chamber which encompasses the particles to be treated and into a pure air chamber which receives the de-particulated process air.

Compared to conventional filter units, the filter unit according to the invention has the advantage that the hood-like filter which consists of a flexible, textile fabric is very simply and quickly exchangeable, so that a manufacturing and/or coating process for particles, carried out on the process apparatus, only needs to be interrupted for a short time. By way of this, it is particular with time-intensive manufacturing and coating processes that a greater production capacity is achieved. Additionally, the possibility of a product change to a different manufacturing and/or coating process for the process apparatus is created, by way of a simple and rapid filter exchange or change.

The filter unit according to the invention, on account of the large filter entry area (cross-sectional area at the connection location between the filter unit and the process apparatus) which corresponds at least essentially to the exit area of the process apparatus, simultaneously has a small surface area which is comes into contact with the product. An increase in the efficiency of the process apparatus, preferably of a granulation or fluidisation apparatus, very particularly preferably a fluidised bed facility, is possible on account of the low accumulation of particles on the surface of the filter unit which comes into contact with the product.

Furthermore, the filter unit according to the invention with a filter of a nature according to the invention (e.g. the filter geometry or the like) is suitable for all construction sizes of process apparatus, preferably of granulation or fluidisation apparatus.

Furthermore, by way of the filter unit according to the invention, one prevents the treated particles from being flung against the lower side of previously applied filters, such as for example blowing-out filters, during the manufacturing and/or coating process. Furthermore, due to the filter unit according to the invention, there is the possibility of increasing the volume flow of process air in the facility, by which means the retention time of the particles to be treated can possibly be significantly reduced. On account of the possible higher volume flow of process air in the facility, the improved treatment is achieved, in particular the drying of the particles around which the process air is rinsed. A more efficient process management is therefore achieved by way of this measure.

According a further advantageous embodiment of the filter unit according to the invention, the sealing element is arranged in a groove. By way of the groove, the sealing element of the sealing mechanism is held or guided in its position, so that an optimal sealing is always achieved between the components which are to be sealed. The groove is preferably a divided groove. Particularly preferably, the divided groove is formed by the filter housing and the filter basket ring. Very particularly preferably, the filter housing has a first flank, a groove base as well as a first part of a second flank of the divided groove and the filter basket ring has a second part of the second flank of the divided groove. The advantage of a divided groove is the fact that an improved sealing is achieved between the filter housing and the filter basket ring in the divided groove is achieved by way of the sealing element which is arranged there, since the individual components are always arranged at the same position on assembly of the filter unit.

Advantageously, the filter basket ring of the filter basket is designed at least essentially in the form of a plate. By way of this, the filter basket is advantageously stabilised in its lower region.

According to an additional advantageous design of the filter unit according to the invention, the sealing element is arranged in the region of a skirt in the lower region of the filter housing. By way of the arrangement of the sealing element in the region of the skirt in the lower region of the filter housing, it is ensured that the filter unit has an adequately large, in particular a maximally large filter surface area.

The sealing element of the sealing mechanism is preferably designed as an inflatable sealing element. Furthermore, the seal is or becomes producible or produced by way of inflating the sealing element. An inflatable sealing element allows the divided groove which is formed by the filter housing and the filter basket ring of the filter basket to be sealed off in an optimal manner and to simultaneously seal the filter housing with respect to the process apparatus, so that by way of the sealing mechanism and the filter, the filter housing is subdivided into a process chamber which encompasses the particles to be treated and into a pure air chamber which is to receive the de-particulated process air.

A further advantage of the filter unit according to the invention is the fact that the filter in its lower region and over its complete periphery is releasably connected to the filter basket ring of the filter basket. Concerning this, the connection between the filter in its lower region over its complete periphery to the filter basket ring of the filter basket is a clip connection or zip connection. Very particularly preferably, the connection between the filter in its lower region over its complete periphery to the filter basket ring of the filter basket is at least essentially dust-proof. By way of this, one additionally prevents the particles to be treated from getting from the process chamber into the pure air chamber. Advantageously, the filter basket is fastenable or fastened to the filter housing by way of a fastening unit which is arranged in the filter housing and which comprises fastening elements, in particular magnets. By way of the fastening unit which comprises the fastening elements, it is ensured that the filter basket can be arranged or fastened in the filter housing in a quick and simple manner, by which means the exchange of the filter is simplified. Furthermore, due to the fastening unit, one succeeds in the filter basket always being equally positioned in the filter housing of the filter unit.

Furthermore, the filter is preferably fastenable or fastened to the filter housing or to the filter basket by way of a suspension unit. By way of the suspension unit, it is possible to rapidly exchange or change the filter and to furthermore additionally fasten a new filter on the filter housing or on the filter basket at the same position. By way of this, a change to another manufacturing and/or coating process is significantly simplified.

The filter unit preferably comprises a blowing-out unit which comprises a nozzle and via which the outer side of the filter can be subjected to blowing air. Particularly preferably, the blowing-out unit is formed by pipes which comprise nozzles and which particularly preferably encompass at least a part of the filter.

Very particularly preferably, the pipes which comprise nozzles encompass the filter at least by essentially 90° and 180° respectively. The filter is subjected to blowing air from the outside by way of the at least one nozzle, so that the filter is cleaned, by which means a continuous operation, at least however a longer-term operation than by conventional means can be ensured. A design of the blowing-out unit in the form of pipes which comprise nozzles is particularly inexpensive in manufacture.

According to an additional advantageous design of the filter unit according to the invention, webs which segment the filter housing into blowing-out regions are arranged in the filter housing. The webs which are arranged in the filter housing lead the blowing-out air onto a region of the filter in a targeted manner and by way of this prevent an inadequate cleaning of the filter which is arranged in the filter unit. Furthermore, the filter itself is preferably subdivided into filter segments by way of stiffening elements, such as for example by way of reinforced seams or the like. By way of this, an insufficient cleaning of the filter which is arranged in the filtering unit is likewise improved.

BRIEF DESCRIPTION OF THE DRAWINGS

The invention is hereinafter explained in more detail by way of the accompanying drawings. There are shown FIG. 1 a lateral view of a filter unit according to the invention, which is arranged on a process apparatus, in a half section, FIG. 2 a perspective representation of the filter unit according to the invention which is arranged on the process apparatus and is shown in FIG. 1, in a part section, FIG. 3 a detailed view of an exemplary fastening unit of the filter basket to the filter housing as well as an exemplary suspension unit of the filter on the filter basket, according to the detail Y which is shown in FIG. 2, FIG. 4 a detailed view of the sealing mechanism with an inflatable sealing element of the filter unit according to the invention, between the filter housing, filter basket ring and process apparatus according to the detail Z which is represented in FIG. 2, of a process apparatus which is not in the operating state, and FIG. 5 a detailed view of the sealing mechanism with an inflatable sealing element of the filter unit according to the invention, between the filter housing, filter basket ring and the process apparatus according to the detail Z of a process apparatus which is in the operating state, said detail represented in FIG. 2.

DETAILED DESCRIPTION OF THE INVENTION

Figure 1:
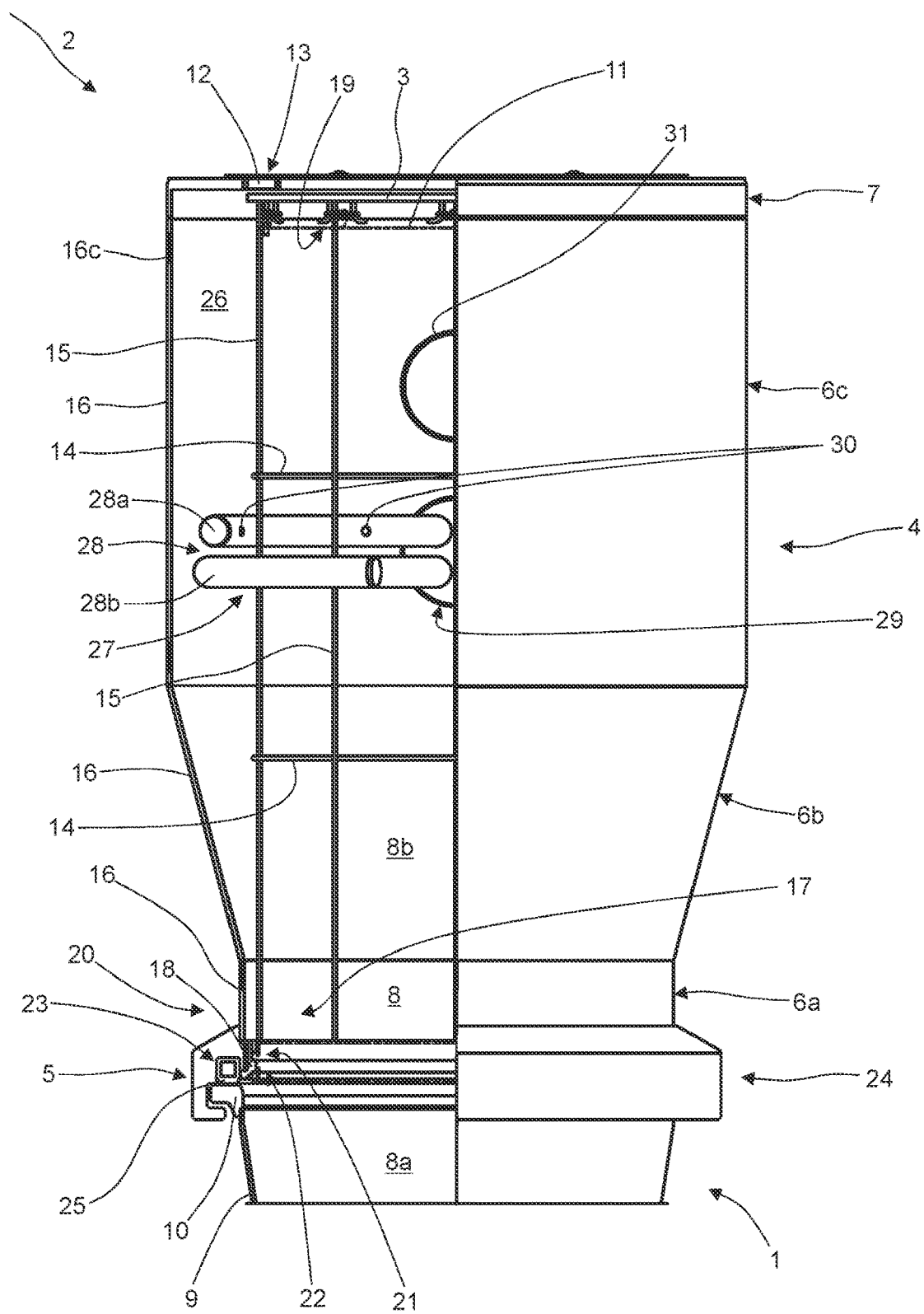

A lateral view of a filter unit 2 according to the invention which is arranged on a process apparatus 1 is shown in a half-section in FIG. 1. The filter unit 2 according to the invention is preferably arranged on the process apparatus 1, in particular on a granulation or fluidisation apparatus, for particulate removal from process air of the process apparatus 1. The filter unit 2 comprises a filter housing 4 which comprises a filter basket 3. The filter housing 4 comprises a skirt 5, in particular a skirt which is designed in a C-shaped manner, as well as a first vertical filter housing section 6a which connects to the skirt 5, a second conical filter housing section 6b, a third vertical filter housing section 6c as well as a filter housing cover 7, for example in the form of a dished base or the like.

The process apparatus 1 in the embodiment comprises a conically designed process apparatus wall 9 which encompasses a first part 8a of a process chamber 8, as well as a flange 10 which interacts with the skirt 5 of the filter housing 4.

The filter basket 3 of the filter unit 2 according to the invention comprises a hood-like filter 11 which consists of a flexible, textile fabric. The hood-like filter 11 is permeable to process air but holds back the particles of the material which are to be treated. Hereby, process air denotes a gaseous medium which flows over an onflow base of the process apparatus 1 which is not shown here, into the first part 8a of the process chamber 8. Preferably, the process air fluidises particles which are received in the first part 8a of the process chamber 8, for their treatment, such as for example for drying or for coating in a coating process.

The filter basket 3 is preferably arranged between the filter 11 and the filter housing 4. The filter basket 3 is fastenable to the filter housing 4 in a direct or indirect manner. Preferably, the filter basket 3 is fastened directly to the filter housing 4. In the embodiment example, the filter basket is fastened to the filter housing cover 7 in a direct manner by way of a fastening unit 13 which is arranged in the filter housing cover 7 of the filter housing 4 and which comprises fastening elements 12, in particular magnets. On account of the fastening unit 13 which comprises the fastening elements 12, the filter basket 3 is arranged in a manner in which it can be fastened to the filter housing 4 in a very simple manner, so that the filter basket 3 can be exchanged or changed very rapidly. Furthermore, on account of the fastening unit 13, one succeeds in the filter basket 3 always being positioned equally in the filter housing 4 of the filter unit 2. An embodiment of the fastening unit 13 is shown in a detailed manner in FIG. 3.

Furthermore, the filter basket 3 comprises horizontal struts 14 and vertical struts 15. The filter basket 3 is designed in a grid-like manner on account of the horizontal and vertical struts 14, 15. The filter basket 3 which is designed in a grid-like manner prevents the filter 11 from being pressed against a filter housing wall 16 by way of the process air which blows onto the filter 11 in the operating state of the process apparatus 1, by which means the filter would stick to the filter housing and the manufacturing and/or coating process is interrupted on account of the absent filtering effect of the filter 11.

The filter basket 3 in the embodiment example furthermore comprises a filter basket ring 18 in its lower region 17. The lower region 17 is defined as the lower third of the filter basket 3. The filter basket 18 ring does not need to assume the complete lower region 17. Preferably, the filter basket ring 18 can be or is designed for example as a horizontal strut 14 or, as is represented in the embodiment example, at least designed essentially in the shape of a plate.

The hood-like filter 11 which consists of a flexible, textile fabric, in the embodiment example is arranged on the filter basket 3 and therefore indirectly on the filter housing 4 by way of a suspension unit 19. An embodiment of the suspension unit 19 is shown in a detailed manner in FIG. 3. In the operating state of the process apparatus 1, the hood-like filter 11 in its lower region 20 is releasably connected over its complete periphery to the filter basket ring 18 of the filter basket 3. It is the lower third of the filter 11 which is defined as the lower region 20. The lower region 20 can additionally consist of a stabilised material, so that the filter 11 comprises a stabilised ending 21. The stabilised ending 21 should have certain flexibility, so that this can be washed, as is the case with the complete filter 11. The connection 22 between the filter 11 and the filter basket ring 18 of the filter basket 3 is preferably a clip connection or zip connection. Particularly preferably, the connection 22 between the hood-like filter 11 over its complete periphery to the filter basket ring 18 of the filter basket 3 is at least essentially dust-proof. Essentially dust-proof is herein defined as impermeable to particles with an average particle size of larger or equal to the average size of the filter pores or filter openings of the filter 11 which is arranged in the filter unit 2.

Furthermore, the filter unit 2 comprises a sealing mechanism 23 with a sealing element 25, in particular with an inflatable sealing element 25, which is arranged on the filter housing 4 in the lower region 24 of this. A lower region 24 is defined as the lower third of the filter housing 4. The sealing element 25 in the operating state of the process apparatus 1 interacts with the filter housing 4, the filter basket ring 18 and the process apparatus 1, in particular the flange 10 of the process apparatus 1, in a manner such that a sealing can be or is produced between the filter housing 4, the filter basket ring 18 and the process apparatus 1, so that the filter housing 4 is subdivided by way of the sealing mechanism 23 and the filter 11 into a second part 8b of the process chamber 8 which encompasses the particles to be treated, and into a pure air chamber 26 which receives the de-particulated process air.

In the embodiment example, a blowing-out unit 27 is arranged between a filter housing wall 16 c of the filter housing section 6c and the filter basket 3, in the region of the third vertical filter housing section 6c, i.e. in the pure air chamber 26. The blowing-out unit 27 is designed in the form of four pipes 28 which are designed as a pressurised air conduit and which are led into the pure air chamber 26 via an inlet 29. The pipes 28 which are designed as a pressurised air conduit are connected to a pressurised air supply which is not represented here and which is preferably arranged above the filter unit 2.

Two pipes 28a and 28b which are closed at the end by a blind plug and which encompass the filter 11 which is arranged on the filter basket 3, at least essentially by 90° (pipe 28a) and at least essentially by 180° (pipe 28b) are represented in the half section of FIG. 1. Each pipe 28 comprises at least one nozzle 30, so that the outer side of the filter 11 can be subjected to blowing air via the blowing-out unit 27. The subjection of the outer side the filter 11 to blowing air by way of the nozzles 30 which are arranged on the pipes 30 is preferably carried out in accordance with a predefined cycle. By way of this, it is possible to clean the filter 11, i.e. to detach the particles to be treated from the inner surface of the hood-like filter 11 and lead them back to the process chamber 8 for further treatment, so that an extension of the treatment time up to a continuous treatment of the particles can be achieved. In regard of this, for an improved cleaning of the filter 11 on the one hand the filter 11 itself can comprise stiffening elements such as stabilised seams or the like, which are not shown here, in order to subdivide the filter 11 into filter segments or on the other hand for example webs which are likewise not shown here can be arranged in the filter housing 4, said webs segmenting the pure air chamber 26 of the filter housing 4 into blowing-out regions. The webs which are arranged in the filter housing 4 lead the blowing-out air onto predefined regions of the filter 11, in particular onto the filter segments for example, in a targeted manner, and on account of this, to an improved extent prevent an insufficient cleaning of the filter 11 which is arranged in the filter unit 2. The two pipes 28c and 28d which are not represented here encompass the hood-like filter 11 in the same manner as the pipes 28a and 28b but seen from the inlet 29 in the opposite direction of the filter 11.

The process air from which the particles of the material to be treated are removed by way of the filter 11 circulates in the pure air chamber 26 and in the embodiment example of FIG. 1 is brought out of the filter unit 2 via an outgoing air opening 31 for the de-particulated process air.

Figure 2:
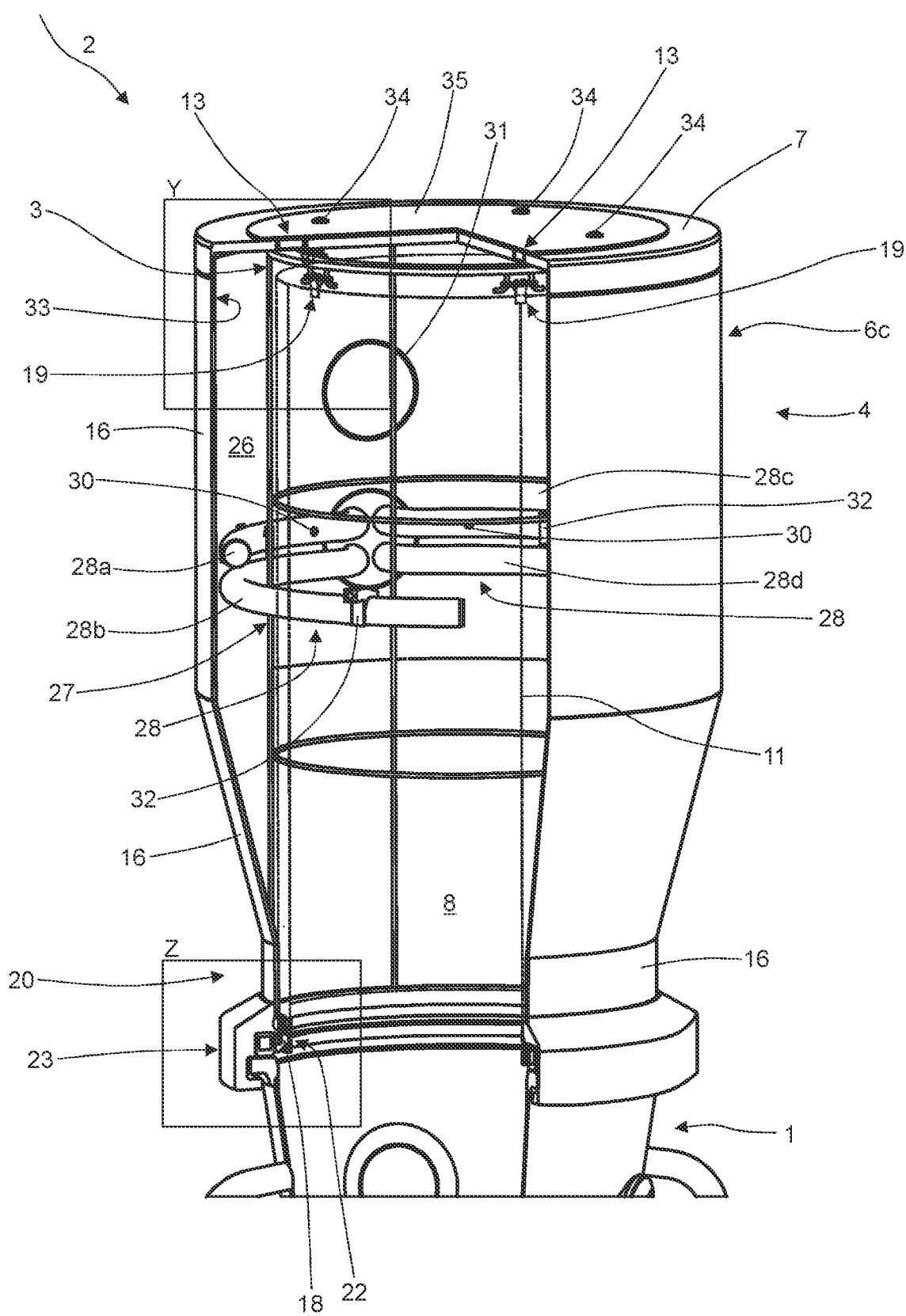

FIG. 2 represents a perspective representation of the filter unit 2 according to the invention 2 which is shown in FIG. 1 and which is arranged on a process apparatus 1, preferably on a granulation or fluidisation apparatus, particularly preferably on a fluidised bed facility, in a part section. The fastening unit 13 for the fastening of the filter basket 3 to the filter housing 4 as well as an exemplary suspension of the filter 11 on the filter basket 3 by way of a suspension unit 19 according to the detail Y is represented in an enlarged manner in FIG. 3 and is explained in more detail. The sealing mechanism 23 of the filter unit 2 according to the invention, between the filter housing 4, the filter basket ring 18 and the process apparatus 1 according to the detail Z is represented in an enlarged manner in FIG. 4 and explained in more detail.

In the embodiment example which is shown in FIG. 2, as already described in FIG. 1, the blowing-out unit 27 which comprises nozzles 30 which are designed in the form of four pipes 28 is arranged in the region of the third vertical filter housing section 6c in the pure air chamber 26. The two upper pipes 28a and 28c encompass the filter 11 which is arranged on the filter basket 3, in opposite directions at least essentially by 90°. In contrast to this, the two lower pipes 28b and 28d encompass the filter 11 in opposite directions at least essentially by 180°. The pipes 28 can be arranged and positioned on the inner wall 33 of the filter housing wall 16 by way of holders 32. The de-particulated process air is led away out of the pure air chamber 26 via the outgoing air opening 31.

The filter housing cover 7 additionally comprises a cover section 35 which is secured to the filter housing cover 7 and is releasably connected to this by way of connection elements 34, in particular screws or the like. The cover section 35 serves as an access to the fastening units 13 in the filter housing cover 7 of the filter housing 4 of the filter unit 2 according to the invention.

Furthermore, in FIG. 2 it is shown that the filter basket 3 comprises a filter basket ring 18 and in the operating state of the process apparatus 1 the filter 11 in its lower region 20 is connected over its complete periphery to the filter basket ring 18 of the filter basket 3 by way of a connection 22, in particular a clip connection or zip connection.

Figure 3:
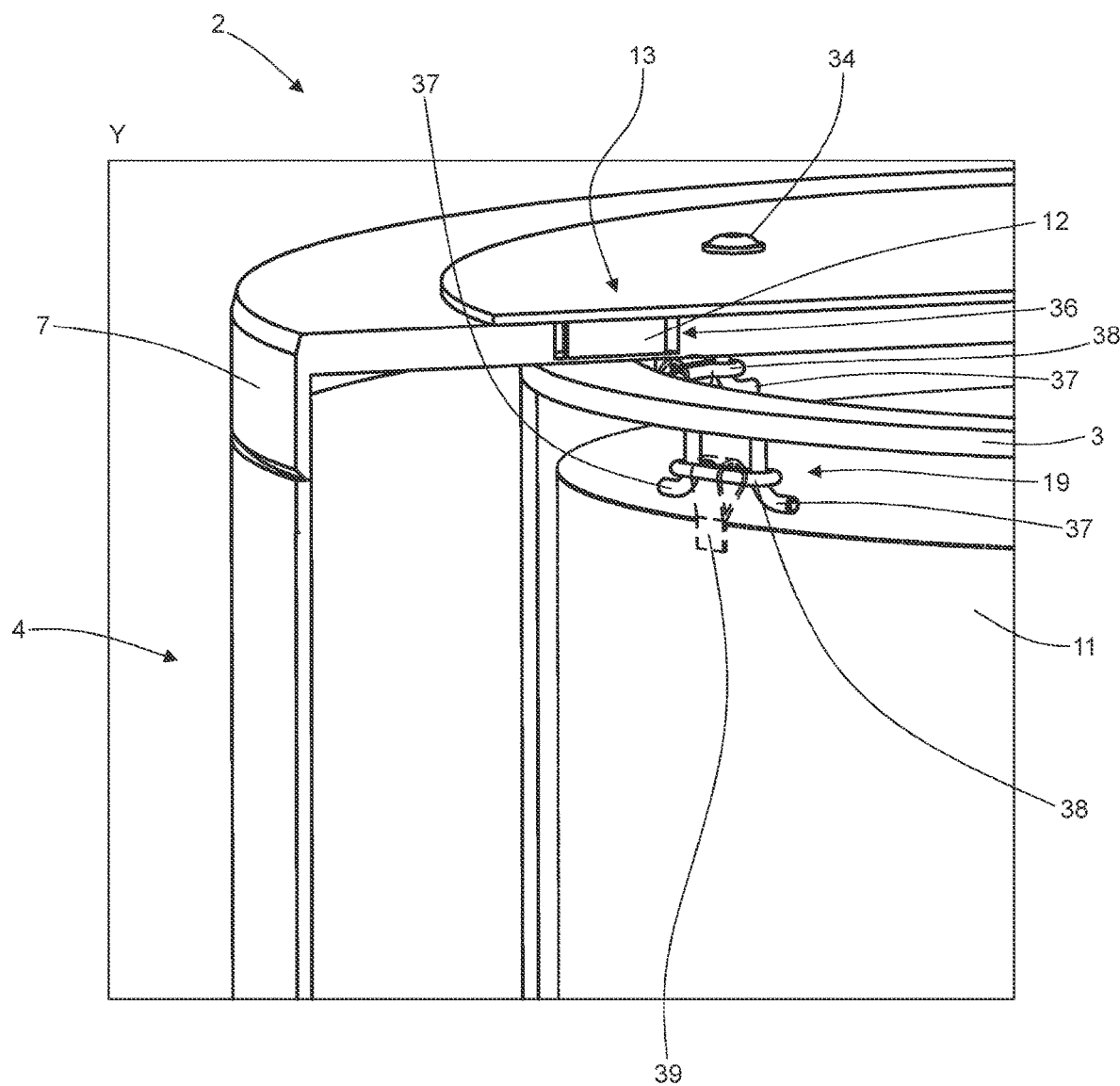

A detailed view of an exemplary fastening unit 13 of the filter basket 3 on the filter housing 4 of the filter unit 2 and of an exemplary suspension unit 19 of the filter 11 on the filter basket 3 according to the detail Y which is represented in FIG. 2 is shown in FIG. 3. In the filter housing cover 7 of the filter housing 4, in the embodiment example fastening elements 12, preferably magnets are arranged in a recess 36 which is envisaged for these. The fastening elements 12 are secured by the cover section 35 which is releasably connected to the filter housing cover 7 by way of connection elements 34. The fastening elements 12 interact with the filter basket 3 which in the embodiment example is metallic, in a manner such that the filter basket 3 is securely arranged in the filter housing 4 and is directly connected to this. Other fastening elements 12 such as screws or the like are likewise conceivable for fastening the filter basket 3 in the filter housing 4.

The hood-like filter 11 which consists of flexible, textile fabric is connected to the filter basket 3 in a direct manner and thus indirectly to the filter housing 4 by way of the suspension unit 19. Hereby, the suspension unit 19 comprises bent pins 37 which are arranged on the filter basket 3 and are away from one another, as well as loops 39 which are arranged on the filter 11 and comprise an elastic ring 38. Other designs of the suspension unit 19 are conceivable. For suspending the hood-like filter 11, the elastic ring 38, in particular a rubber ring, which is arranged on the loop 39 is spanned over the bent pins 37 which are arranged on the filter basket 3 and are away from one another. By way of this, the filter 11 can be removed from the filter basket 3 very quickly, by which means a rapid exchange or change of the hood-like filter 11 is possible and despite this is arranged on the filter basket in a secure manner.

Figure 4:
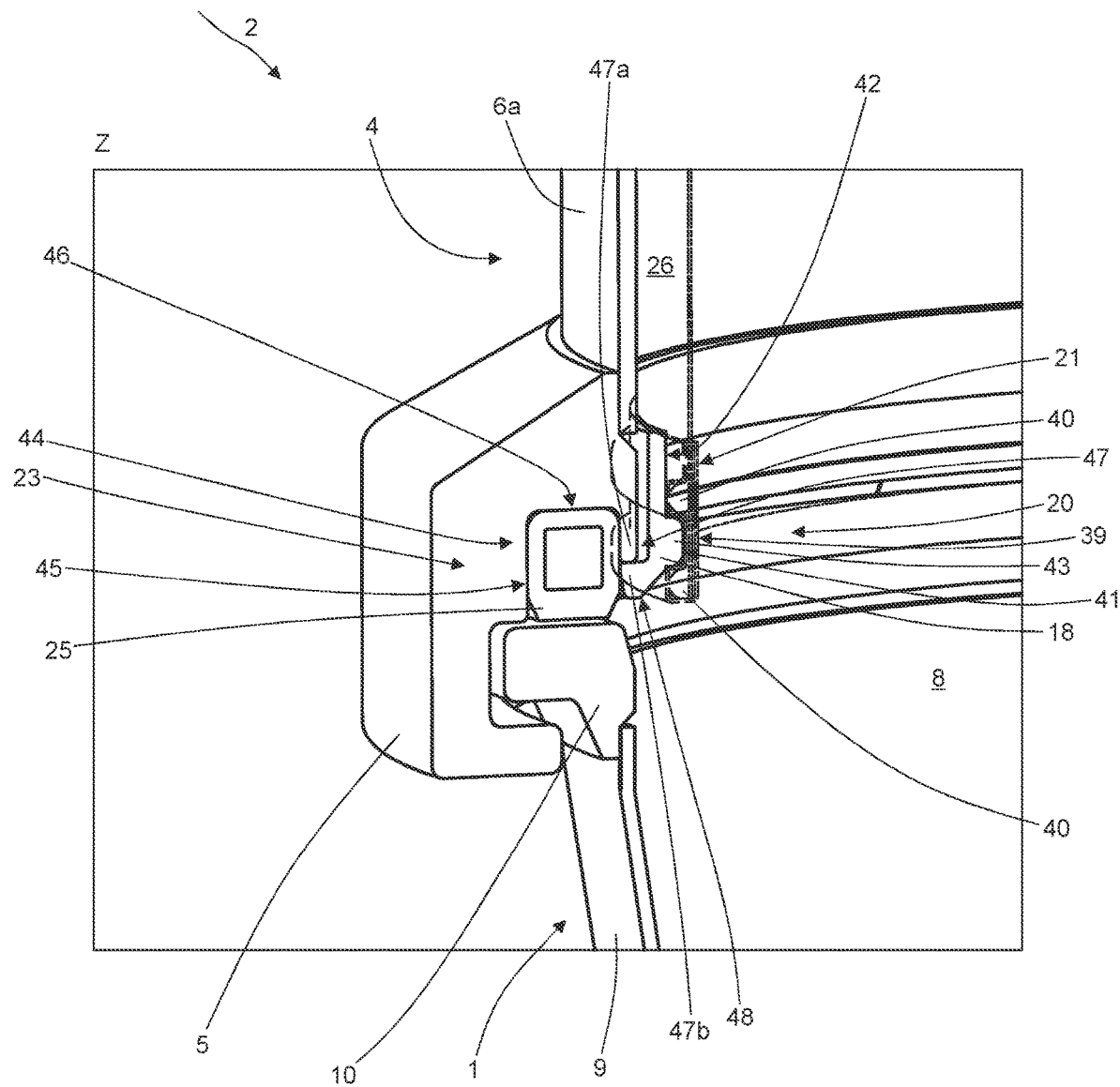

A detailed view of the sealing mechanism 23 with an inflatable sealing element 25 of the filter unit 2 according to the invention between the filter housing 4, filter basket ring 18 and a process apparatus 1 according to the detail Z which is shown in FIG. 2, of a process apparatus which is not in the operational state, i.e. is with a non-inflated sealing element 25, is represented in FIG. 4. The filter housing 4 which comprises the first vertical filter housing section 6a and a skirt 5, in particular a C-rib is connected to the process apparatus 1 via a flange 10 which belongs to the process apparatus 1 and which connects onto the process apparatus wall 9. For this, the flange 10 engages into the skirt 5 which is designed with a C-shape.

The hood-like filter 11 in its lower region 20 comprises a stabilised ending 21 over its complete periphery. This ending comprises a plate-like base body 39 and web-like prominences which are arranged on this, so that a U-shaped profile 41 results in the cross section of the stabilised ending 21. The plate-like base body 39 and the web-like prominences 40 form a first part of the connection 22, in particular a clip connection or zip connection.

The filter basket ring 18 of the filter basket 3 in its lower region 17 on the side 42 which faces the filter 11 comprises a web-like prominence 43 which is complementary to the U-shaped profile 41 of the stabilised ending 21. This prominence forms a second part of the connection 22. Together, the U-shaped profile 41 of the stabilised ending 21 and the complementary web-like prominence 43 form the connection 22.

In the embodiment example, the stabilised ending 21 of the hood-like filter 11 is connected over its complete periphery to the filter basket ring 18 of the filter basket 3 by way of the represented connection, and the connection 22 is preferably dust-proof, so that no particles of the material to be treated can get from the process chamber 8 into the pure air chamber 26.

The sealing mechanism 23 for sealing between the process chamber 8 and the pure air chamber 26, comprising the sealing element 25 which is arranged in a groove 44, is arranged at least partly in the skirt 5 of the filter housing 4. In the embodiment example, the sealing element 25 of the sealing mechanism 23 is designed as an inflatable sealing element 25. The groove 44 in which the sealing element 25 is arranged, in the embodiment example is designed as a divided groove 44. The divided groove 44 is hereby formed by the filter housing 4, in particular by the skirt 5, and the filter basket ring 18. Hereby, the skirt 5 of the filter housing 4 comprises a first flank 45, a groove base 46 as well as a first part 47*a* of a second flank 47 of the divided groove 44, and the filter basket ring comprises a second part 47*b* of the second flank 47 of the divided groove 44. The second part 47*b* of the second flank 47 of the divided groove 44, formed on the filter basket ring 18, is designed in the form of a web 48 which is peripheral around the complete circumference of the filter basket ring 18. The sealing element 25 of the sealing mechanism 23 is held or guided in its position by way of the groove 44, in particular the divided groove 44, so that an optimal sealing between the components to be sealed, the filter housing 4, the filter basket ring 18 and the process apparatus 1 is always achieved. The advantage of a divided groove 44 is the fact that an improved sealing between the filter housing 4 and the filter basket ring 18 in the divided groove 44 is achieved by the sealing element 25 which is arranged there, since the individual components are always arranged at the same position on assembly of the filter unit 2.

The sealing element 25 in its non-inflated state, i.e. the process apparatus is not in operation, does not seal between the process chamber 8 and the pure air chamber 26.

Figure 5:
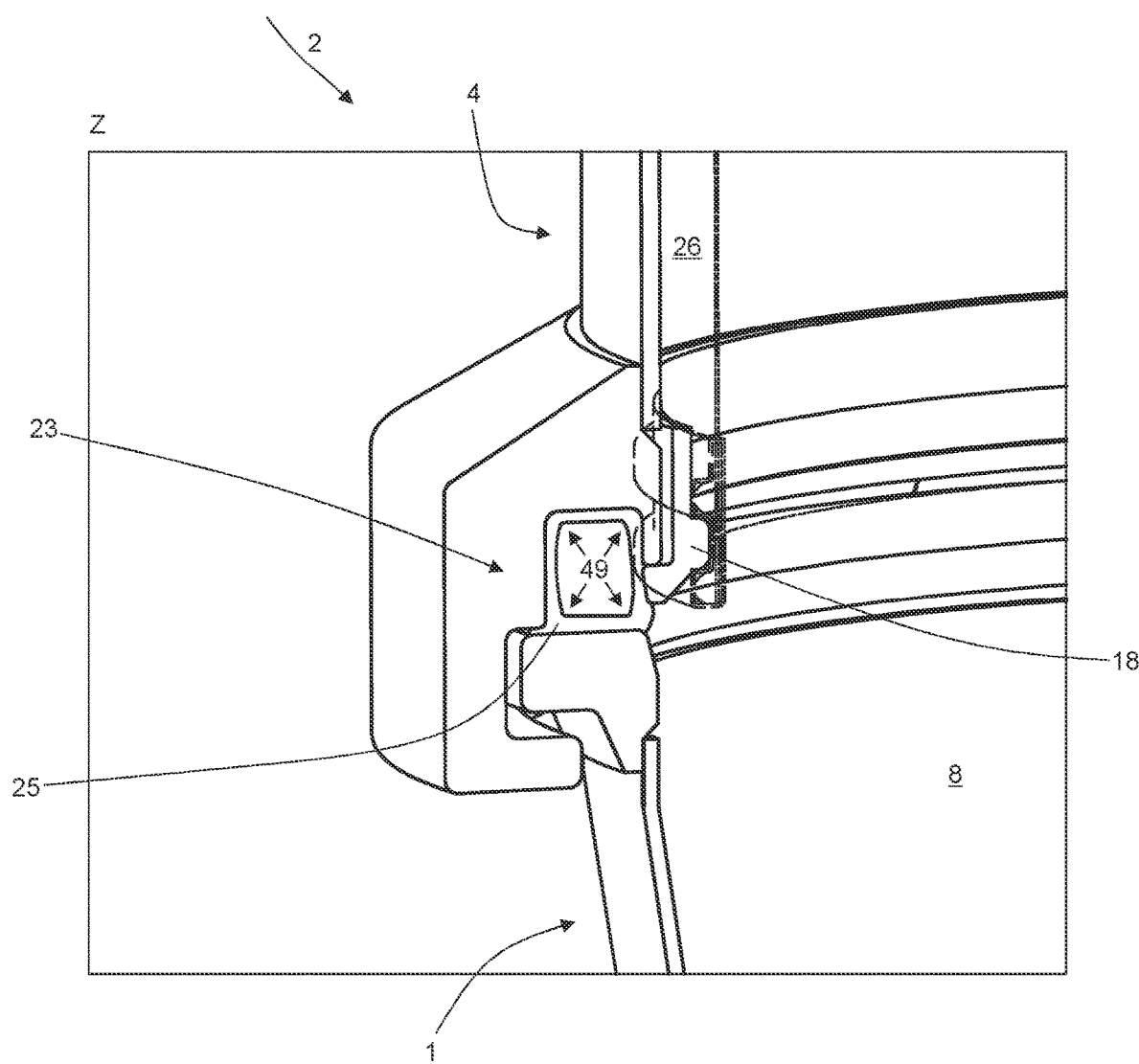

FIG. 5 shows a detailed view of the sealing mechanism 23 with an inflatable sealing element 25 of the filter unit 2 according to the invention, between the filter housing 4, the filter basket ring 18 and the process apparatus 1, according to the detail Z which is represented in FIG. 2, of a process apparatus 1 which is in the operating state, i.e. the sealing element 25 is inflated. The divided groove 44 forms by way of the filter basket 3 which is arranged in the filter housing 4 and in particular its filter basket ring 18. The gas pressure within the sealing element 25 acts in the direction of the represented arrows 49 upon the sealing element 25 which is at least partly led through the divided groove 44 in its extension, so that this sealing element seals the filter unit 2 with respect to the process apparatus 1 in a manner such that the filter housing 4 is subdivided into a process chamber 8 and into a pure air chamber 26.

The divided groove 44 hereby has a double function, specifically, as mentioned above, on the one hand of ensuring a sealing between the filter housing 4 and the process temperature 1 and on the other hand a sealing between the filter housing 4 and the filter basket ring 18.

Simultaneously, by way of the filter unit 2 according to the invention, compared to conventional filter units, it is ensured that the hood-like filter 11 which consists of a flexible, textile fabric is exchangeable in a simple and rapid manner, so that a manufacturing and/or coating process, in particular for particles, which is carried out on the process apparatus is only to be interrupted for a short time. By way of this, the production capacity of the facility is increased. Furthermore, on account of the simple and rapid possibility of an exchange or change of the filter 11, a change of the manufacturing and/or coating process to another product on the process apparatus 1 is optimised.

The invention claimed is:

1. A filter unit configured to be arranged on a process apparatus for particulate removal from process air of the process apparatus, comprising:
    a filter housing which comprises a filter basket, wherein the filter basket comprises a filter basket ring and a hood-like filter which consists of a flexible, textile fabric, the filter being permeable to process air but holding back particles of a material which are to be treated; and
    a sealing mechanism including a sealing element arranged on a lower region of the filter housing,
    wherein the filter basket is arranged between the filter housing and the filter, and the filter basket and the filter are fastenable or are fastened to the filter housing in a direct or indirect manner, and
    wherein in an operating state of the process apparatus,
        a complete periphery of a lower region of the filter is connected to the filter basket ring of the filter basket, wherein the connection is substantially dust proof, and
        the sealing element interacts with the filter housing, the filter basket ring, and the process apparatus to produce a seal between the filter housing, the filter basket ring, and the process apparatus so that the filter housing is subdivided by the sealing mechanism and the filter into a process chamber encompassing the particles being treated and a pure air chamber which receives de-particulated process air.

2. The filter unit according to claim 1, wherein the sealing element is arranged in a groove.

3. The filter unit according to claim 2, wherein the groove is a divided groove.

4. The filter unit according to claim 3, wherein the divided groove is formed by the filter housing and the filter basket ring.

5. The filter unit according to claim 4, wherein the filter housing comprises a first flank, a groove base, and a first part of a second flank of the divided groove, and
    wherein the filter basket ring comprises a second part of the second flank of the divided groove.

6. The filter unit according to claim 1, wherein the filter basket ring of the filter basket is shaped in the form of a plate.

7. The filter unit according to claim 1, wherein the sealing element is arranged in a region of a skirt in the lower region of the filter housing.

8. The filter unit according to claim 1, wherein the sealing element of the sealing mechanism is an inflatable sealing element.

9. The filter unit according to claim 8, wherein the seal is producible by inflating the sealing element.

10. The filter unit according to claim 1, wherein the complete periphery of the lower region of the filter is releasably connected to the filter basket ring of the filter basket.

11. The filter unit according to claim 10, wherein the connection between the complete periphery of the lower region of the filter and the filter basket ring of the filter basket is at least one of a clip connection or zip connection.

12. The filter unit according to claim 10, wherein the connection between the complete periphery of the lower region of the filter and the filter basket ring of the filter basket is dust-proof.

13. The filter unit according to claim 1, wherein the filter basket is fastenable to the filter housing by a fastening unit arranged in the filter housing, and wherein the fastening unit comprises fastening elements.

14. The filter unit according to claim 13, wherein the fastening elements comprise magnets.

15. The filter unit according to claim 1, wherein the filter is fastenable to at least one of the filter housing or the filter basket by a suspension unit.

16. The filter unit according to claim 1, wherein the filter unit comprises a blowing-out unit comprising a nozzle, and wherein the nozzle subjects the outer side of the filter to blowing air.

17. The filter unit according to claim 1, further comprising webs arranged in the filter housing, wherein the webs segment the filter housing into blowing-out regions.

18. The filter unit according to claim 1, wherein the process apparatus is at least one of a granulation apparatus or fluidisation apparatus.

* * * * *